United States Patent
Schilling et al.

(10) Patent No.: US 10,946,441 B2
(45) Date of Patent: Mar. 16, 2021

(54) CONTROL UNIT, DEVICE AND METHOD FOR THE PRODUCTION OF A THREE-DIMENSIONAL OBJECT

(71) Applicant: EOS GmbH Electro Optical Systems, Krailling (DE)

(72) Inventors: Alexander Schilling, Munich (DE); Georg Fey, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 468 days.

(21) Appl. No.: 15/310,467

(22) PCT Filed: May 13, 2015

(86) PCT No.: PCT/EP2015/060694
§ 371 (c)(1),
(2) Date: Nov. 11, 2016

(87) PCT Pub. No.: WO2015/173355
PCT Pub. Date: Nov. 19, 2015

(65) Prior Publication Data
US 2017/0072468 A1  Mar. 16, 2017

(30) Foreign Application Priority Data
May 14, 2014  (DE) .................... 10 2014 209 161.6

(51) Int. Cl.
*B22F 3/105* (2006.01)
*B33Y 10/00* (2015.01)
(Continued)

(52) U.S. Cl.
CPC .......... *B22F 3/1055* (2013.01); *B23K 26/142* (2015.10); *B23K 26/16* (2013.01);
(Continued)

(58) Field of Classification Search
CPC .... B22F 3/1055; B22F 3/1056; B22F 3/1057; B22F 3/1058; B22F 3/1059;
(Continued)

(56) References Cited

U.S. PATENT DOCUMENTS 5,730,925 A  3/1998 Mattes
5,876,767 A  3/1999 Mattes
(Continued)

FOREIGN PATENT DOCUMENTS

DE  19514740 C1  4/1995
DE  19649865 C1  12/1996
(Continued)

OTHER PUBLICATIONS

International Preliminary Report on Patentability, dated Nov. 15, 2016; 32 pages.

*Primary Examiner* — Philip C Tucker
*Assistant Examiner* — Jimmy R Smith, Jr.
(74) *Attorney, Agent, or Firm* — Seyfarth Shaw LLP

(57) ABSTRACT

A device (1) for producing a three-dimensional object (2) through layer-wise solidifying of build-up material (13) at positions (43) corresponding to a cross-section of the object (2) to be produced in a respective layer comprises a coating device (12-14) for applying a layer of the build-up material (13) on a working plane (10), a solidifying device (20) for the selective solidifying of the build-up material (13) in the applied layer and a gas suction nozzle (34) for extracting gas from the device (1) by suction. The gas suction device (34) is thereby movably arranged and the device (1) is designed to control or to regulate a movement and/or orientation of the gas suction nozzle (34) as a function of a number of reference positions (51, 53, 55a, 55b, 55c, 55d).

16 Claims, 5 Drawing Sheets

(51) Int. Cl.

| | |
|---|---|
| *B33Y 40/00* | (2020.01) |
| *B29C 64/364* | (2017.01) |
| *B33Y 30/00* | (2015.01) |
| *B23K 26/342* | (2014.01) |
| *B23K 26/142* | (2014.01) |
| *B29C 64/153* | (2017.01) |
| *B33Y 50/02* | (2015.01) |
| *B23K 26/70* | (2014.01) |
| *B23K 26/16* | (2006.01) |
| *B28B 1/00* | (2006.01) |
| *B28B 17/00* | (2006.01) |
| *B23K 101/00* | (2006.01) |

(52) U.S. Cl.
CPC .......... *B23K 26/342* (2015.10); *B23K 26/702* (2015.10); *B28B 1/001* (2013.01); *B28B 17/0081* (2013.01); *B29C 64/153* (2017.08); *B29C 64/364* (2017.08); *B33Y 10/00* (2014.12); *B33Y 30/00* (2014.12); *B33Y 40/00* (2014.12); *B33Y 50/02* (2014.12); *B22F 2003/1056* (2013.01); *B22F 2003/1057* (2013.01); *B22F 2201/10* (2013.01); *B22F 2998/10* (2013.01); *B22F 2999/00* (2013.01); *B23K 2101/001* (2018.08); *Y02P 10/25* (2015.11)

(58) Field of Classification Search
CPC . B22F 2003/1057; B33Y 10/00; B33Y 40/00; B33Y 50/02; B29C 64/153; B29C 64/393; B29C 64/364
USPC .......................................... 264/344, 101, 677
See application file for complete search history.

(56) References Cited

U.S. PATENT DOCUMENTS

| | | | |
|---|---|---|---|
| 6,215,093 B1 | 4/2001 | Meiners | |
| 6,583,379 B1 | 6/2003 | Meiners | |
| 7,828,022 B2 * | 11/2010 | Davidson | ................ B29C 64/35 |
| | | | 141/18 |
| 8,267,683 B2 * | 9/2012 | Inoue | ....................... A61C 7/12 |
| | | | 118/308 |
| 2002/0041818 A1 | 4/2002 | Abe | |
| 2002/0090410 A1 * | 7/2002 | Tochimoto | ............ B29C 64/165 |
| | | | 425/215 |
| 2004/0094728 A1 * | 5/2004 | Herzog | ................. B22F 3/1055 |
| | | | 250/559.06 |
| 2015/0125333 A1 * | 5/2015 | Bruck | ................... B22F 3/1055 |
| | | | 419/1 |
| 2016/0136731 A1 * | 5/2016 | McMurtry | .............. B29C 64/20 |
| | | | 419/53 |

FOREIGN PATENT DOCUMENTS

| | | |
|---|---|---|
| DE | 19853947 C1 | 11/1998 |
| DE | 102004031881 A1 | 1/2006 |
| DE | 102012014841 A1 | 1/2014 |
| WO | 1992008592 A1 | 5/1992 |
| WO | 1997006918 A1 | 2/1997 |
| WO | 2014199150 A1 | 12/2014 |

* cited by examiner

CONTROL UNIT, DEVICE AND METHOD FOR THE PRODUCTION OF A THREE-DIMENSIONAL OBJECT

TECHNICAL FIELD OF THE INVENTION

The present invention relates to a device for producing a three-dimensional object through layer-wise solidifying of build-up material at the positions corresponding to the cross-section of the object to be produced in the respective layer through the application of energy. It also relates to a control unit for such a device and to a method of moving and/or orientating a gas suction nozzle.

BACKGROUND OF THE INVENTION

A device of this type is used, for example, for rapid prototyping, rapid tooling or rapid manufacturing. An example of such a method known by the name "selective laser sintering or laser melting" as well as an associated device for implementing the method are described in document DE 195 14 740 C1. According to this document, by means of a coating device a thin layer of the build-up material in powder form is initially applied and this is then solidified at the positions corresponding to the respective cross-section of the object through the effect of a laser beam, i.e. melted and/or fused forming a joint material. In this context a solidifying position is a location which is subject to this solidifying process, i.e. at which in particular the melting and/or fusing (currently) takes place. The solidifying position can therefore also be called the melting position. The two steps of application and solidifying are alternatingly repeated until the three-dimensional object to be produced is completed.

During irradiation with the laser beam, depending on the type of material being used, in particular in the case of the sintering or melting of metal powders, splashes, fumes, thick smoke, vapors and/or gases occur which spread into the processing chamber. These can have a disruptive effect on the production process, e.g. through disrupting the propagation of the laser beam, being precipitated on the coupling-in window for the laser beam or becoming deposited on or in the surface of the powder layer facing the laser beam and forming disruptive inclusions when solidifying of subsequent object positions which reduce the quality of the completed object or have a negative effect on the application of the subsequent layer.

In order to remove such contaminants from the processing chamber DE 198 53 947 C1 proposes a processing chamber in which at two opposite ends a protective gas inlet and a protective gas outlet are arranged through which a directed protective gas flow through the processing chamber is created. Additionally in this patent, in the lateral surface of a heightened area, in the cover surface of which a coupling-in window for laser beam to be coupled in is arranged, there are further inlet openings for a protective gas. A protective gas flow entering through these openings protects the coupling-in window from becoming dirty.

In WO 92/08592 A1, in one embodiment a laser sintering device is described in which a gas flow is directed from above onto the layer of applied powder in the direction of incidence of a laser beam and laterally extracted by suction via an annular nozzle which surrounds the entire working area in which the object is being built up.

DE 196 49 865 C1 describes a method of producing a molded body in which in one embodiment an inlet nozzle, which is moved together with the laser beam, directs a locally limited protective gas flow over a melting position at which the powder is melted by a laser beam.

Laser sintering devices nowadays have relatively large building areas onto which the powder layer is applied and solidified, e.g. being of the order of magnitude of 400×400 mm. In the case of building areas of this size it is possible that larger and heavier particles are not fully removed by the gas flow but settle on the surface of the powder layer during transportation through the processing chamber. When applying and solidifying a subsequent powder layer, such particles form disruptive inclusions which reduce the quality of the completed object.

It can also happen that particles of the aforementioned type, for example, become deposited in other areas of the interior of laser sintering devices and that these contaminants impair the operation of the laser device over time.

Such deposits occur on the aforementioned coupling-in window for example.

SUMMARY OF THE INVENTION

The object of the present invention is therefore to provide an improved device and an improved method of producing a three-dimensional object. In particular, the effect of extracting disruptive particles by suction is preferably to be improved. Such an improvement can consist, for example, in that larger and heavier particles, produced during the solidifying of the build-up material, can also be reliably extracted by suction, whereby the quality of the completed object can be improved or the operation of the device simplified. A further improvement can also consist in that a more efficient effect of extraction by suction of disruptive particles is also achieved in the case of large building areas and/or at areas of the interior of the device more distant from the building area.

The object is achieved through a device according to claim 1, a control unit according to claim 11 and a method according to claim 13. Furthermore, the aim is also achieved through a kit (usable for retrofitting existing devices for instance) according to claim 12, a method according to claim 14 and a computer program according to claim 15. Refinements of the invention are each set out in the sub-claims. The methods can each be further developed among each other and also through the features of the devices set out below or in the sub-claims, or vice-versa. The device according to the invention can in particular also be further developed, in particular with a control device according to the invention and a corresponding kit.

The approach according to the invention essentially comprises the following aspects:

a) Instead of the firmly installed, i.e. immobile gas suction nozzles used to date in the prior art, the gas suction nozzle is now arranged movably in the device.

b) The movement or orientation of the movable gas suction nozzle is controlled or regulated as a function of a number of reference positions. These reference positions are preferably arranged within the device and can be designated as reference locations. For controlling or regulating the movement or orientation of the gas suction nozzle the prior definition of one or more such reference positions is necessary. As a reference position or (synonymous) reference location a point-like or area-like (for example circularly or elliptically arranged around a point) location can be used, but other two or three-dimensional shapes can also function as a reference location, for example also linear locations. For the movement or orientation of the gas suction nozzle the reference position(s) provide(s) a type of spatial or twodimensional coordinate by means of which this movement or orientation can take place more specifically and more effectively.

This is set out by way of an example of application of the present invention not described in more detail below: during the operation of the device, i.e. during the production of a three-dimensional object, the movable gas suction nozzle is used for the extraction of particles by suction over the building area. After completion of this production process it is now specifically moved further upwards for providing suction on the coupling-in window of the device and thus cleaning it from contaminants.

For this, for the control or regulation of the movement of the gas suction nozzle any location defined in advance, i.e. determined location, in the interior of the device can be used as a reference position, by means of which the movement or orientation is coordinated.

For this control or regulation a single reference position, but also a plurality (two or more) of reference positions can be used. The former involves less work in terms of defining the reference position while the latter can result in more precise orientation of the gas suction nozzle in space.

Preferably the reference positions comprise at least one current reference solidifying position in the working plane. In contrast to the above-described example of application, there is therefore at least one reference position on the working plane (i.e. a predefined plane, namely the plane on which the aforementioned process particles are generally formed and from where they are to be removed by suction) and is a (current) solidifying position. This can mean, for example, that the current reference solidifying position is at a different place over the time, namely there where (in the example of selective laser sintering) the laser beam is currently in contact with the working plane. For the position or orientation of the gas suction nozzle this means that it can, for example, be continuously (alternatively also in a stepwise manner) adapted and its position and orientation always relate to the current (reference) solidifying position.

Alternatively or additionally, the device according to the invention can also be designed to define a current reference solidifying position from a current solidifying area. In doing so, the solidifying position which is at the greatest distance from a current position of the gas suction nozzle is preferably defined as the current reference solidifying position of the current solidifying area position. This means that the defined current reference solidifying position, serving as reference position for the movement or orientation of the gas suction nozzle, does not necessarily have to be the position at which solidifying is currently taking place. Rather, the reference solidifying position selected here indicates a coordinate from which it can be derived how far away the gas suction nozzle is from the (outer) edge of the current solidifying area facing away from the gas suction nozzle, i.e. what the maximum distance is between the gas suction nozzle and a possible location of an emission of particles from which the gas suction nozzle should be able to extract the particles by suction.

It is particularly preferable that the device according to the invention is designed in such a way that during operation it ensures that (at least during a predefined period of time) a distance between the gas suction nozzle and at least one of the number of reference positions does not exceed and/or fall below a predetermined (i.e. predefined) distance value. Such a distance value can thus serve as an upper and/or lower limit. It is preferably selected in such a way that, with its suction performance as intended, the gas suction nozzle achieves an optimal suction effect, in particular on the building area. Such an optimum is achieved when, if possible, essentially all disruptive particles are extracted by the suction nozzle and at the same time no disruptive effects, such as through gas turbulence on the powder surface, occur. In connection with this the inventors have determined that the upper limit of the distance value in the case of a selective laser sintering device is, in respect of the aforementioned optimum, preferably 100 mm, particularly preferably 80 mm and very particularly preferably 50 mm. The lower limit can be close to 0 mm, but is preferably larger or equal to 5 mm, particularly preferably larger or equal to 10 mm—also in respect of the aforementioned optimum.

Further features and expediencies of the invention are set out in the description of exemplary embodiments with the aid of the attached drawings.

Figure 1:
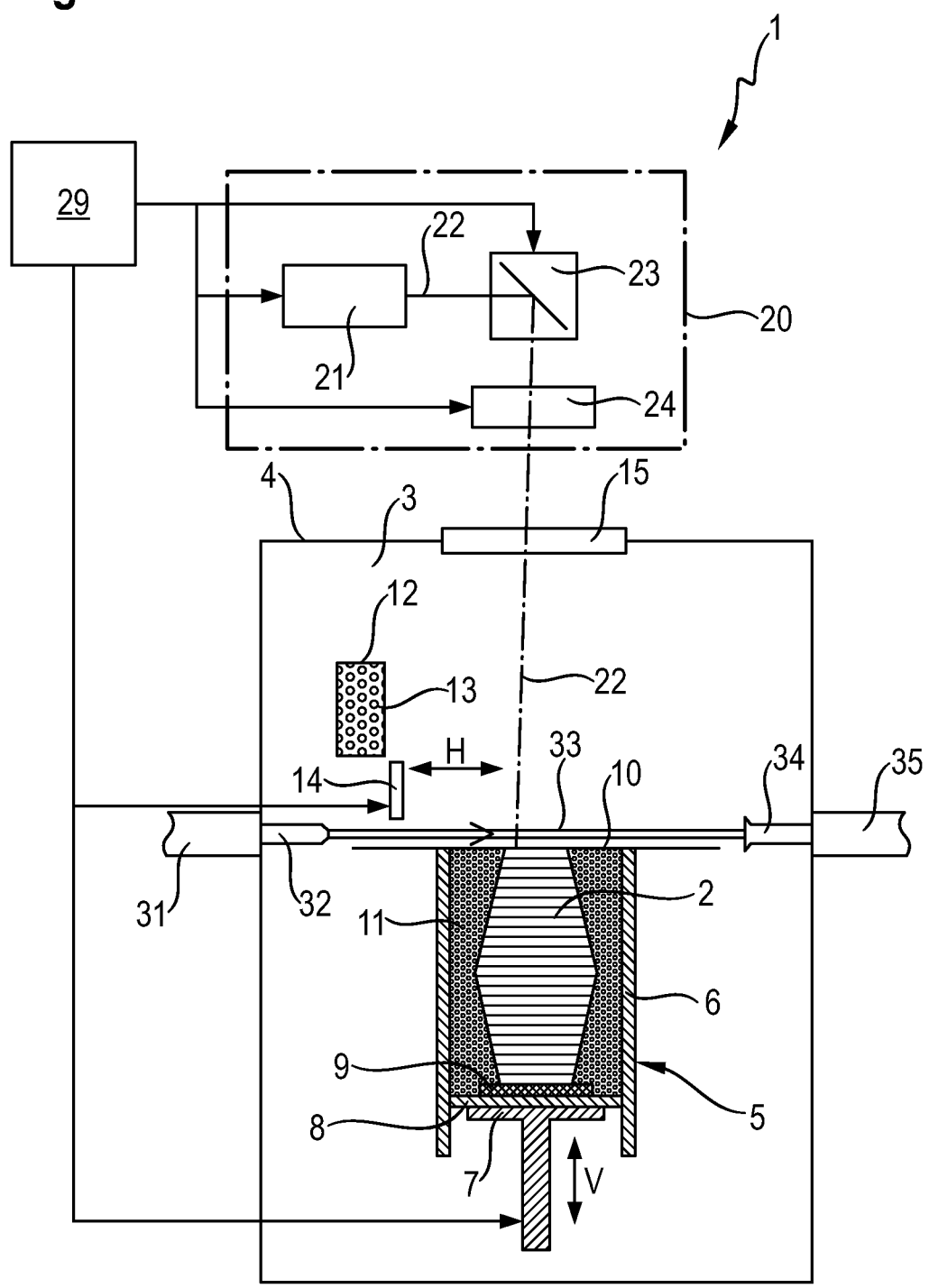
FIG. 1 shows a schematic view, partially in cross-section, of an exemplary embodiment of a device for the layer-wise production of a three-dimensional object, which is suitable for implementing the present invention.

A device 1 according to one embodiment of the present invention is described below with reference to FIG. 1. The device shown in FIG. 1 is a laser sintering or laser melting device 1. To produce an object 2, it comprises a processing chamber 3 with a chamber wall 4.

Arranged in the processing chamber 3 is a container 5 which is open at the top and has a wall 6. Arranged in the container 5 is a carrier 7 movable in a vertical direction V on which a base plate 8 is applied which closes off the container 5 at the bottom and thus forms its base. The base plate 8 can be a plate formed separately from the carrier 7 which is attached to the carrier 7, or it can be formed in an integral manner with the carrier 7. Depending on the powder and process used, a building platform 9, on which the object 2 is built up, can also be applied on the base plate 8. However, the object 2 can also be built on the base plate 8 itself, which then serves as the building platform. In FIG. 1, the object 2 to be formed in the container 5 on the building platform 9 is shown below a working plane 10 in an intermediate condition with several solidified layers, surrounded by build-up material 11 that has remained unsolidified.

The laser sintering device 1 also comprises a storage container 12 for build-up material 13 in powder form which can be solidified through electromagnetic radiation and a coating device 14 movable in a horizontal direction H for applying the build-up material 13 on the working plane 10. On its upper side the wall 4 of the processing chamber 3 has a coupling-in window 15 for the radiation 22 serving to solidify the powder 13.

The laser sintering device 1 also comprises an irradiation device 20 with a laser 21 which produces a laser beam 22 which is deflected by a deflection device 23 and focused by way of a focusing device 24 via the coupling-in window 15 on the working plane 10.

The laser sintering device 1 also comprises a control unit 29 via which the individual components of the device 1 can be controlled in a coordinated manner in order to implement the building process. The control unit can comprise a CPU, the operation of which is controlled by a computer program (software).

To produce a (preferably laminar) gas flow 33 in the processing chamber 3 the laser sintering device 1 also comprises a gas supply channel 31, a gas inlet nozzle 32, a gas suction nozzle 34 and a gas removal channel 35. The gas supply and removal can also be controlled by the control unit 29. The gas extracted from the processing chamber 3 by suction can be supplied to a (not shown) filter device and the filtered gas can be returned via the gas supply channel 31 to the processing chamber 3, whereby a recirculation system with a closed gas circulation is formed. Instead of only one gas inlet nozzle 32 and one gas suction nozzle 34 several nozzles can also be provided in each case.

During operation, in order to apply a powder layer, the carrier 7 is first lowered by a height which preferably corresponds to the required layer thickness. Using the coating device 14 a layer of the powder build-up material 13 is then applied. Application takes place at least over the entire cross-section of the object 2 to be produced, preferably over the entire building area 10. The cross-section of the object 2 to be produced is then scanned by the laser beam 22 so that the build-up material 13 in powder form is solidified at these positions. These steps are repeated until the object 2 is completed and can be removed from the building space.

During building the object 2, a gas, preferably a protective gas, for example argon and/or nitrogen, is introduced into the processing chamber through the gas inlet nozzle 32 and extracted therefrom by suction through the gas suction nozzle 34.

According to the present invention at least one gas suction nozzle is movably arranged in such a way that it can be brought into the proximity of the area of the applied powder layer that is currently being solidified by the laser beam.

DETAILED DESCRIPTION OF THE EMBODIMENTS

Figure 2:
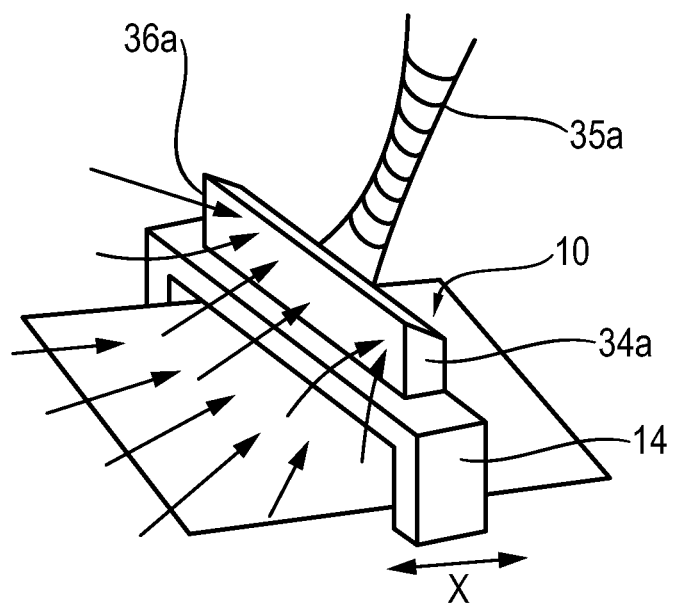
FIG. 2 shows a schematic, perspective view of a movable gas suction nozzle according to a first embodiment of the present invention for explaining a first embodiment of the method according to the invention.

FIG. 2 schematically shows a first embodiment of the movable arrangement of a gas suction nozzle 34a. In this embodiment a gas suction nozzle 34a is attached to the coating device 14, i.e. mechanically connected to the coating device 14, and can be moved together with the coating device 14 over the working plane 10 and the powder layer applied thereon. The movement takes place in a first direction (x direction) to and fro parallel to the working plane. In the first direction the gas suction nozzle 34a has a gas suction opening 36a. In a second direction (y direction) perpendicular to the first direction, but also parallel to the working plane 10, the gas suction nozzle 34a has a width extending approximately over the entire width of the coating device and thus approximately over the entire building area, i.e. the area of the working plane 10 lying within the upper opening of the container 5. The gas suction opening 36a extends approximately over the entire width of the gas suction nozzle 34a.

In particular, the gas suction nozzle 34a can be moved with the coating device 14 in such a way that it is always in the vicinity of a current solidifying position, which can be used as a reference position in accordance with the invention. Designated here as the current solidifying position is the position in the working plane 10 at which the laser beam is currently in contact with the powder, heating and thus solidifying it, i.e. the position at which contaminants such as splashes, fumes, thick smoke, vapors and/or gases currently occur. In other words, the movement and/or orientation of the gas suction nozzle is controlled as a function of the current solidifying position in such a way that, in particular, a predetermined distance between the solidifying position and the gas suction nozzle is not exceeded, wherein the predetermined distance is smaller than the dimensions of the building area.

In comparison with a gas flow which flows through the entire processing chamber, with this movable gas suction nozzle 34a, larger and heavier particles, which would otherwise settle on the powder layer while being transported through the processing chamber, can also be effectively extracted from the processing room by suction. In order to be able to transport such particles with a gas flow which flows through the entire processing chamber, the through-flow and/or speed of the gas flow would have to be increased, which could disturb the surface of the applied powder layer. Through controlling the movable gas suction nozzle 34a as a function of the current solidifying position these particles can be effectively extracted with a smaller through-flow and/or speed of the gas flow, as a result of which disturbance of the surface of the applied powder layer is avoided. Furthermore, suction takes place over the entire building area (the entire upper surface of the container 5) with approximately constant suction strength so that location-dependent differences in the quality of the built object 2 are prevented.

Realization of the movable arrangement of the gas suction nozzle though mechanically connecting the gas suction nozzle to the coating device (in particular through attaching the gas suction nozzle to the coating device) has further advantages.

With the coating device a device is already present in the laser sintering device that can be moved over the entire building area, so that for moving the gas suction nozzle no additional moving device is required. This reduces work and costs during the production of the device.

In addition, coating and irradiation can, for example, be carried out in parallel in one working step, i.e. the powder can already be solidified during the application of the powder layer in the already applied and smoothed area in the direction of movement behind the coating device. In this way the production time for an object is shortened.

In order to prevent unwanted changes of the surface of the building area (particularly the powder layer currently applied by the coating device), the working plane 10 can be slightly moved down after coating. Additionally or alternatively solidifying can be carried out in an area of the working plane "behind" the coating device, i.e. following after the coating device in the direction of coating.

However, the present invention is not restricted to the gas suction nozzle being carried along with the coating device. The gas suction nozzle can also be moved over the working plane independently of the coating device.

Figure 3:
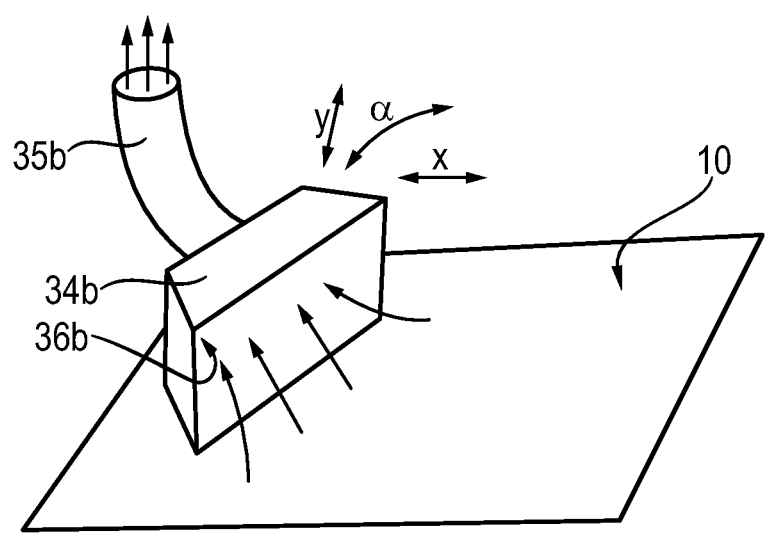
FIG. 3 shows a schematic, perspective view of a movable gas suction nozzle according to a second embodiment of the present invention.

FIG. 3 schematically shows a second embodiment of the movable arrangement of a gas suction nozzle 34b. In this embodiment a gas suction nozzle 34b is arranged freely movably in the processing chamber. It can move in the x direction and in the y direction parallel to the working plane and turn about any angle α about an axis—here perpendicular to the working plane 10. Rotation about any angle (not shown) about an axis parallel to the working plane 10, i.e. a rotation in the direction of the working plane 10 or upwards away from the working plane 10, is also possible. It can thus, in any orientation, be brought to any position of the building area. Through this the width of the gas suction nozzle 34b and its gas suction opening 36b no longer has to extend approximately over the entire width of the building area, but can be much smaller.

Free movement of the gas suction nozzle 34b can be realized, for example, through installation on a swivel arm that has the required degree of freedom of movement.

Figure 4:
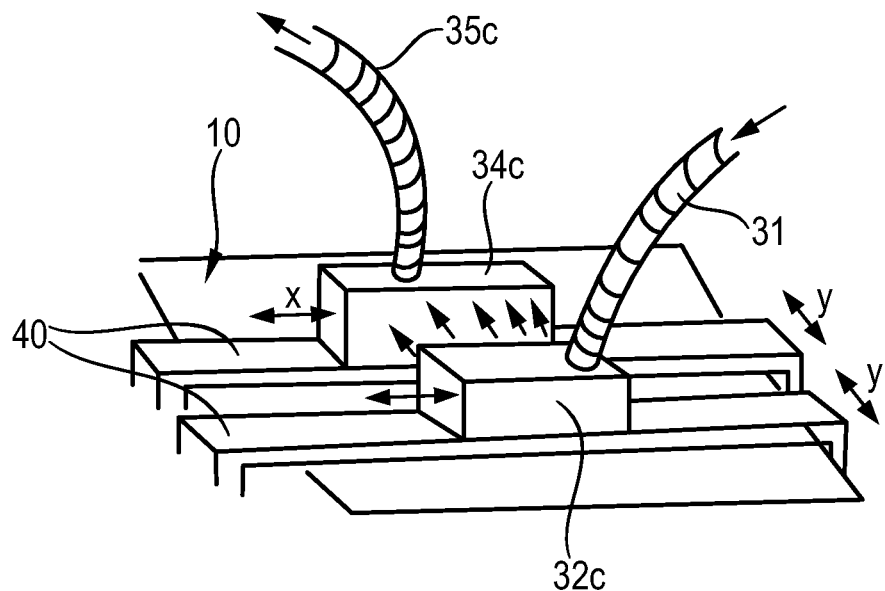
FIG. 4 shows a schematic, perspective view of a movable gas suction nozzle according to a third embodiment of the present invention.

FIG. 4 schematically shows a third embodiment of the movable arrangement of a gas suction nozzle 34c. In this embodiment a gas inlet nozzle 32c and a gas suction nozzle 34c are arranged facing each other on a linear movable portal system 40. The portal system 40 can move the nozzles parallel to each other and with a variable or constant distance from each other in the x direction and y direction parallel to the working plane. This also achieves that the nozzles are brought to every position of the building area, but their orientation and distance from each other and therefore the relative direction and magnitude of the gas flow between them can be maintained. In this embodiment too the nozzles 32c, 34c can have a substantially smaller width than that of the building area 10.

Figure 5:
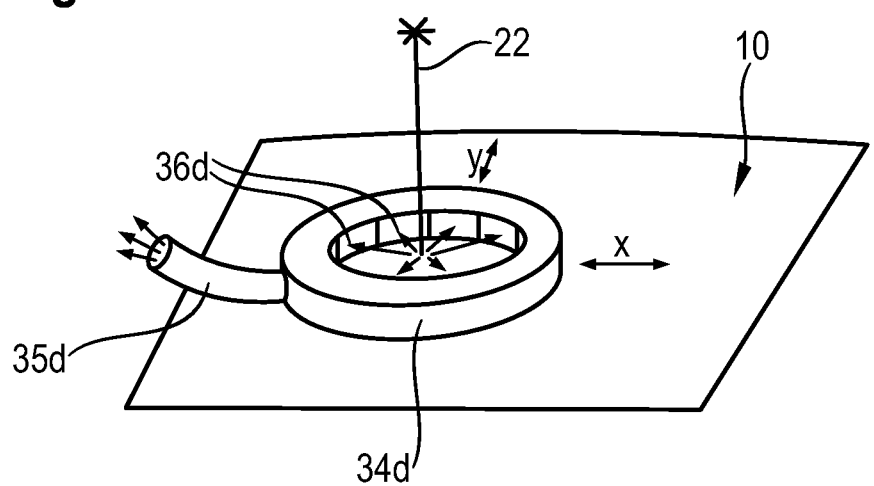
FIG. 5 shows a schematic, perspective view of a movable gas suction nozzle according to a fourth embodiment of the present invention.

FIG. 5 schematically shows a fourth embodiment of the movable arrangement of a gas suction nozzle 34d. In this embodiment a gas suction nozzle 34d is formed as a ring nozzle 34d which has suction openings 36d along its inner circumference. In this way the gas is extracted by suction symmetrically from the middle of the ring nozzle 34d towards all sides. This ring nozzle 34d is preferably moved relative to the laser beam 22 in such a way that the laser beam 22 is always approximately in the middle of the ring nozzle 34d.

Figure 6:
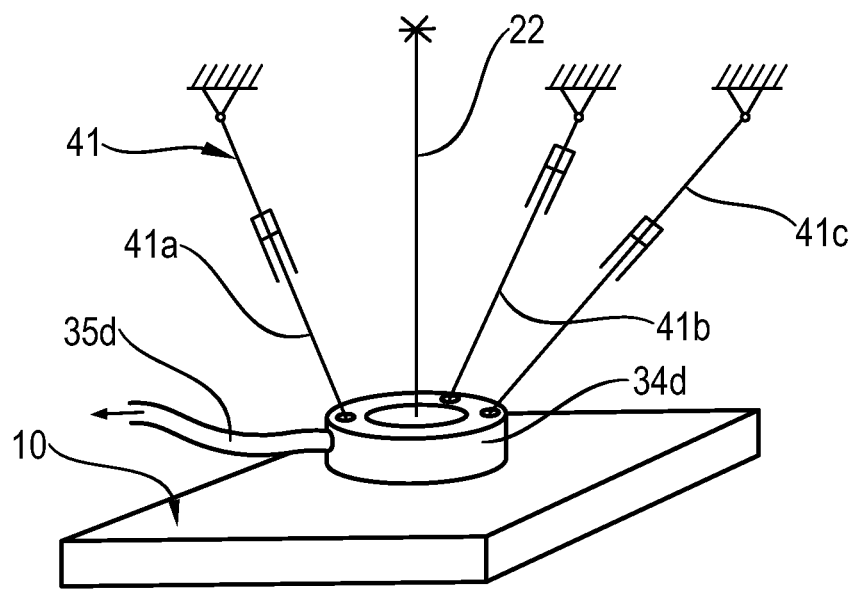
FIG. 6 shows a schematic, perspective view of a tripod suspension used for moving the gas suction nozzle of the fourth embodiment.

FIG. 6 schematically shows a suspension of this ring nozzle 34d on a tripod 41. The latter comprises three legs 41a, 41b and 41c which are adjustable in length and can, for example, be extended and retracted in accordance with the telescopic principle or by way of a cylinder and piston combination. Also an articulated parallelogram guidance of the tripod 41 is possible, through which parallel guidance of the ring nozzle 34d can be brought about in a particularly simple manner. At one end these legs 41a, 41b, 41c are connected with the ring nozzle 34d and at the other end they are anchored in the space in a fixed but pivotable manner. Through coordinated changing of the settings of the dimensions of the three legs 41a, 41b and 41c the ring nozzle 34d can be moved over the building area parallel to the working plane 10.

In the embodiments described above, cases are illustrated in which always a single gas suction nozzle is movably arranged. However, in each of these embodiments two or more gas suction nozzles can be movably arranged connected to each other or independent of each other.

Figure 7:
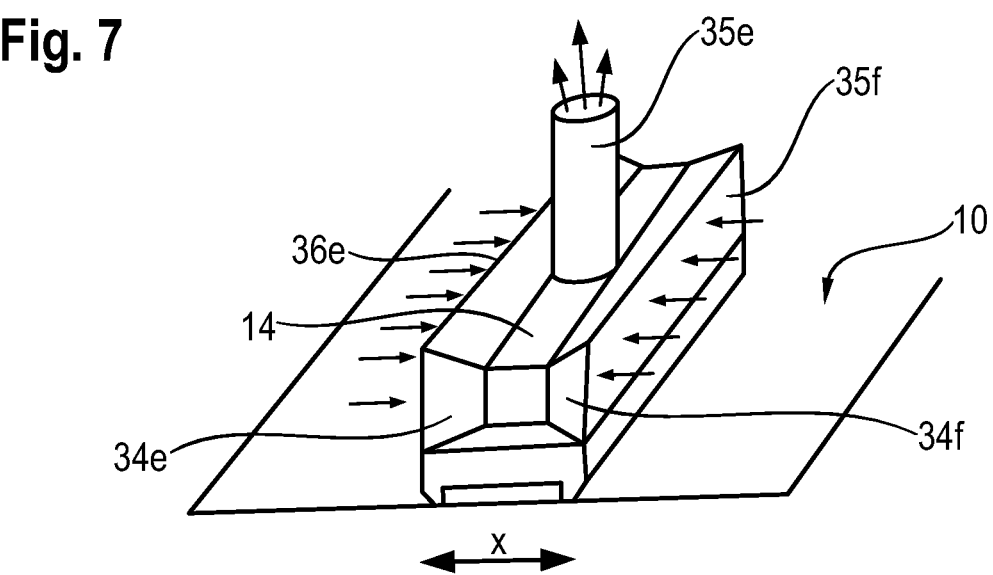
FIG. 7 shows a schematic, perspective view of a movable gas suction nozzle according to a fifth embodiment of the present invention.

As an example, FIG. 7 shows a fifth embodiment of the movable arrangement of a gas suction nozzle. In this embodiment two gas suction nozzles 34e and 34f are attached to a coating device 14 and aligned in the two directions of movement of the coating device 14. Thus, for example, when the coating device is moving in one direction, one of the nozzles 34e, 34f can be activated, and when it is moving in the opposite direction, the other can be activated. Therefore coating and irradiation can be carried out in parallel even in the caase of coating devices designed for applying the powder layer in both directions of movement. Alternatively both nozzles 34e, 34f can be operated simultaneously, for example, if solidifying in the working plane on both sides of the coating device 14 is to take place at the same time.

In all the above-described embodiments the gas inlet nozzle 32 and/or the gas suction nozzle 34 can each be designed so that the speed of the gas flow depends on the height above the working plane.

Figure 8:
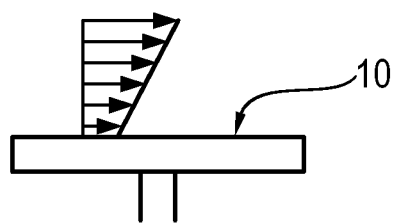
FIG. 8 shows a schematic view of a speed distribution of a gas flow above a working plane.

FIG. 8 schematically shows a view of a speed distribution of a gas flow above the working plane 10. Close to the powder surface the speed is low so that no powder is blown and sucked away. This is particularly important when using light metal powders, such as aluminum. In the upward direction, i.e. in continuation of a direction from the working plane 10 to the gas suction nozzle (or, analogously, a gas inlet nozzle) the speed increases so that splashes, for example, can be reliably removed by suction. Such a speed distribution can be brought about, for example, in that the gas inlet nozzle 32 and/or the gas suction nozzle 34 contains channels lying vertically above one another, which are differently designed with regard to each other and/or are differently exposed to gas overpressure or gas underpressure, respectively.

The units set out in the embodiments described above which bring about the movement of the gas suction nozzle, only serve as examples and do not constitute any restrictions. They can also be interchanged between the embodiments. For example, the portal 40 shown in FIG. 4 and described in the third embodiment can also be used for moving a ring-shaped gas suction nozzle as shown in FIG. 5 and described in the fourth embodiment, or the tripod shown in FIG. 7 and described in the fourth embodiment can also be used to move a combination of a gas inlet nozzle 32 and gas suction nozzle 34, as shown in FIG. 4 and described in the third embodiment. Other devices (actuators) which are suitable for moving the gas suction nozzle over the entire building area can also be used in each embodiment.

As the movement of the coating device 14 is controlled by the control unit 29, the movement of the gas suction nozzle 34, when this is attached to the coating device 14, is also controlled by the control device 29. However, even if the gas suction nozzle 34 is not mechanically connected to the coating device 14, the movement of the gas suction nozzle 34 can be controlled or regulated by the control unit 29. As the control unit 29 also controls the irradiation device 20 and thus determines the current and future solidifying positions, the control unit 29 can control or regulate the movement of the gas suction nozzle 34 as a function of these solidifying positions as reference positions. If the gas suction nozzle 34 is controlled or regulated by a separate control unit, the information about the respective solidifying positions is forwarded from the control unit 29 to the separate control unit for this purpose.

Figure 9:
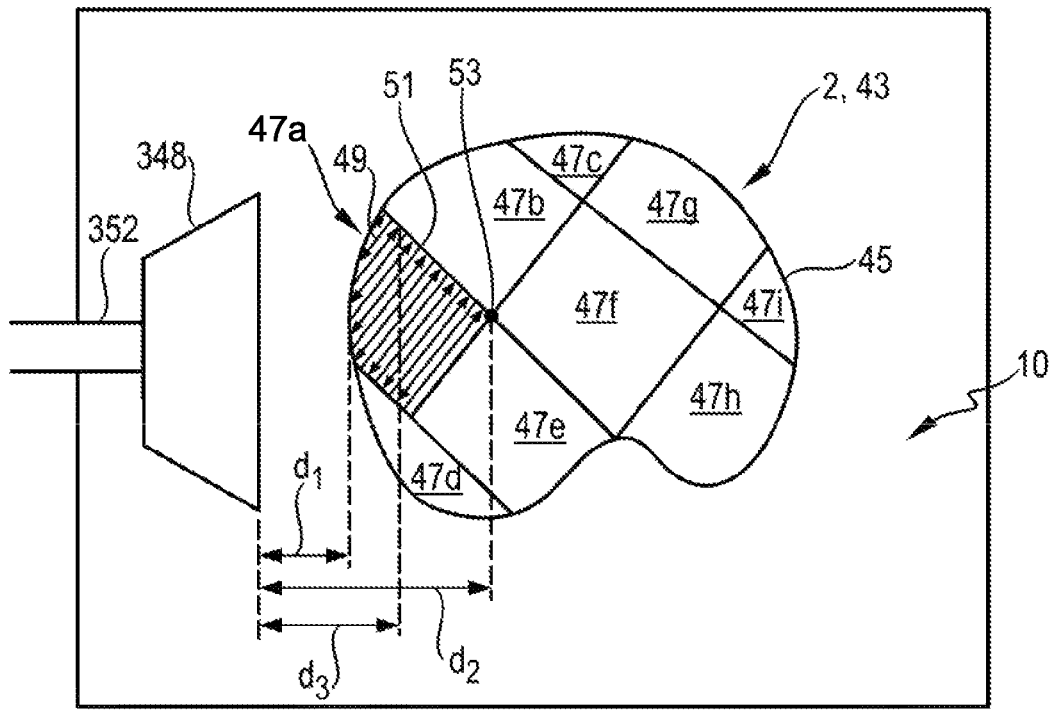
FIG. 9 shows a schematic view from above of a building area with a movable gas suction nozzle according to the second embodiment in order to illustrate a second embodiment of the method according to the invention.

FIG. 9 shows a schematic view from above of a building area 10 with a movable gas suction nozzle 34b according to the second embodiment (cf. FIG. 3) in order to illustrate a first embodiment of the method according to the invention.

In a current layer on working plane 10 the object 2 is successively solidified in a solidifying area 43. For this the solidifying area 43 has been divided into a contour 45 and so-called irradiation fields 47a-i or solidifying fields 47a-i in which solidifying is successively carried out, for example in the letter sequence a to i in accordance with the reference numbers 47a-i. This solidifying takes place along scan vectors 49 which are here indicated schematically in a current first solidifying field 47a. In the shown condition, solidifying is taking place at a solidifying position 51 in the first solidifying field 47a. A movement or orientation of the gas suction nozzle 34b can thus take place as a function (according to the first embodiment of the method according to the invention, see above) of the course of this solidifying position 51 as the reference solidifying position 51 along the scan vectors 49, and, for example, follow this course, continuously or in steps, at a distance $d_3$.

The first solidifying field 47a comprises a solidifying position 53 which, though not currently being solidified, is to serve as the reference solidifying position 53 instead of solidifying position 51 in the second embodiment of the method. This reference solidifying position 53 is the position in the current solidifying field 47a which is at the greatest distance from the current position of the gas suction nozzle 34b. The suction effect of the suction nozzle 34b must therefore reach as far as this reference solidifying position 53 in order to achieve adequate action of suction. The position and/or orientation of the gas suction nozzle 34b is/are therefore adjusted in such a way that the distance $d_2$ between the suction nozzle 34b and the reference solidifying position 53 does not exceed a predetermined distance value, preferably 100 mm, particularly preferably 80 mm, and even more particularly preferably 50 mm. On the other hand a distance $d_1$ between the gas suction nozzle 34b and the edge of the current solidifying field 47a facing the gas suction nozzle 43b must not be less than a further predetermined distance value. In particular it must be avoided that the gas suction nozzle 34b extends into the current solidifying field 47a as it would otherwise hinder the solidifying process. The same rule preferably also applies to the aforementioned course distance $d_3$ in the first embodiment of the method according to the invention.

The second embodiment provides the advantage that the gas suction nozzle 34b does not have to be carried along constantly, but can remain stationary at one or more positions during solidifying in a solidifying field.

Figure 10:
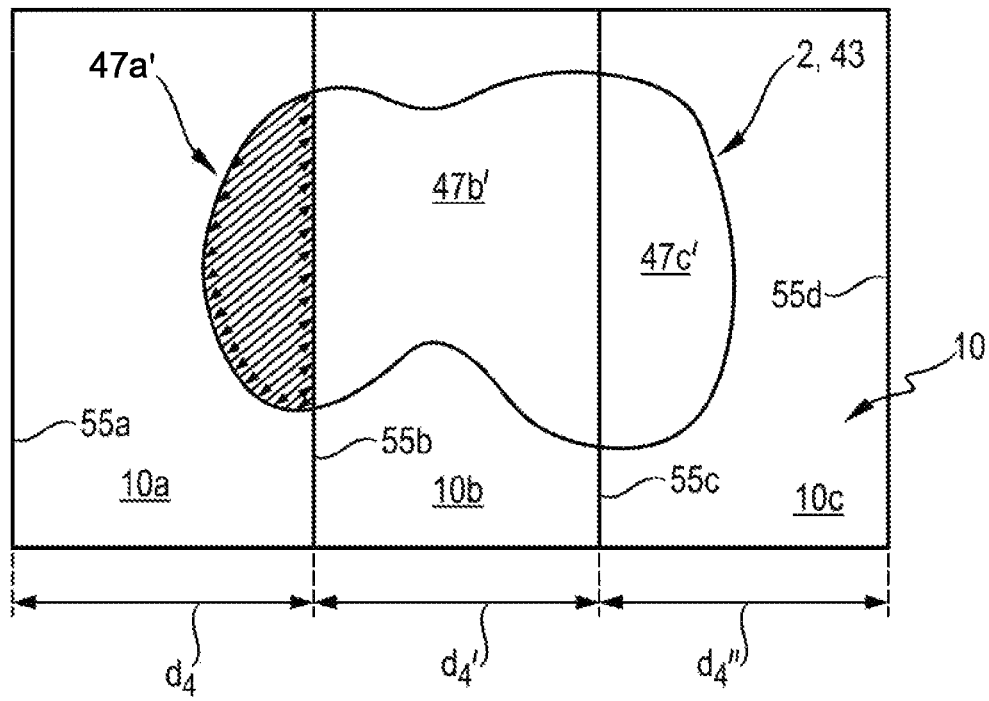
FIG. 10 shows a schematic view from above of a building area in order to illustrate a third embodiment of the method according to the invention.

FIG. 10 serves to illustrate the third embodiment of the method according to the invention. Here the building area 10 is divided into several (in this case three) building area sections 10a, 10b, 10c. The first building area section 10a extends along a first distance $d_4$ from a first (left) edge 55a of the building area 10 to a first limiting line 55b, which here runs parallel to the first edge 55a. From the first limiting line 55b, the second building area section 10b extends along a second distance $d_4'$ to a second limiting line 55c (which here is again aligned parallel to the first limiting line 55b), to which then adjoins the third building area section 10c along a third distance $d_4''$ up to the second (right) edge of the building area 10. In the present example, the first, second and third distance $d_4$, $d_4'$, $d_4''$ are equal in size. In the layer present here, the object 2 to be produced extends over all three building area sections 10a, 10b, 10c, wherein the building area sections 10a, 10b, 10c in the layer in the object 2 define solidifying fields 47a', 47b', 47c'.

In the third embodiment of the method a movable gas suction nozzle (not shown), preferably one which covers the entire width of the building area 10 (i.e. the extent perpendicular to the distances $d_4$, $d_4'$, $d_4''$) with its suction effect, is moved as a function of the edges 55a, 55d and the limiting lines 55b, 55c as reference position 55a, 55b, 55c, 55d. For example, therefore the gas suction nozzle 34a can be used. The distances $d_4$, $d_4'$, $d_4''$ are preferably determined in such a way that their values correspond with the predetermined distance values already described with regard to the second embodiment of the method. In this third embodiment too, the corresponding gas suction nozzle can be temporarily operated fixed at one location, for example (and this is preferred) fixed at one location per building area section 10a, 10b, 10c or solidifying field 47a', 47b', 47c' respectively.

Also otherwise, features of the various embodiments can be combined where this is possible.

Even though the present invention has been described by way of a laser sintering or laser melting device, it is not restricted to laser sintering or laser melting. It can be used for any method of producing a three-dimensional object through the layer-wise application and selective solidifying of a build-up material in which the suction of a gas, more particularly a protective gas takes place.

The laser can for example comprise a gas laser or a solid-state laser or a laser diode. In general every device can be used with which energy can be selectively applied to a layer of the build-up material. Instead of a laser, for example another light source, an electron beam or any other energy or radiation source suitable for solidifying the build-up material can be used. The invention can also be used for selective mask sintering, in which an extended light source and a mask are used, or for absorption and inhibition sintering.

Instead of applying energy, the selective solidifying of the applied build-up material can also take place through 3D printing, for example through the application of an adhesive. In general the invention relates to the production of an object through layer-wise application and selective solidifying of a build-up material irrespective of the nature and way in which the build-up material is solidified.

When using a powder as the build-up material various types of powder can be used, in particular metal powder, plastic powder, ceramic powder, sand, filled or mixed powders. As the protective gas, depending on the build-up material used, a gas is employed which does essentially not undergo any chemical reaction with the build-up material, for example, in the case of plastic powder preferably nitrogen or in the case of metal powder preferably argon and/or nitrogen.

The invention claimed is:

1. A method of moving and orienting a movable gas suction nozzle in an apparatus for producing a three-dimensional object through layer-wise solidifying of build-up material at positions corresponding to a cross-section of the object to be produced in a respective layer, wherein the method comprises:
   providing a coating device that applies a layer of the build-up material on a working plane;
   providing an energy or radiation source suitable for solidifying the build-up material that selectively solidifies the build-up material in the applied layer by impingement of a beam of the energy or radiation source on an applied layer;

providing a control unit that controls the energy or radiation source, the control unit further determining solidifying positions corresponding to cross-sections of the object, and the control unit selecting a plurality of reference positions on the working plane to then control movement and orientation of the gas suction nozzle in relation to the impingement of the beam using the reference positions;

operating the gas suction nozzle to extract gas from a build chamber of the apparatus by suction, the gas suction nozzle being movably mounted above the working plane, wherein the reference positions comprise at least one nozzle orientation reference position selected from solidifying positions of a cross-section of the object being produced in the working plane; and operating the control unit to move and orient the nozzle using the at least one nozzle orientation reference position.

2. The method according to claim 1, wherein the at least one nozzle orientation reference position is taken from a solidifying field which is an area of the cross-section of the object being produced, where a position of the solidifying field which is at a greatest distance from an actual position of the gas suction nozzle is defined as the at least one nozzle orientation reference position.

3. The method according to claim 1, wherein at least during a predetermined period of time, a distance between the gas suction nozzle and at least one of the plurality of reference positions does not exceed a predetermined distance value.

4. The method according to claim 1, wherein:
the coating device is movable parallel to the working plane; and
the gas suction nozzle is mechanically connected to move with the coating device.

5. The method according to claim 1, wherein the gas suction nozzle is movably arranged in two directions (x, y) parallel to the working plane.

6. The method according to claim 1, wherein the gas suction nozzle is arranged in a rotatable manner about at least one axis chosen from an axis perpendicular to the working plane or an axis parallel to the working plane.

7. The method according to claim 1, further comprising a gas inlet for supplying a gas into the apparatus,
wherein the gas inlet and the gas suction nozzle are arranged in opposed fashion to each other and can be moved in tandem with each other and parallel to the working plane with a substantially constant distance from one another.

8. The method according to claim 7, wherein at least one of the gas inlet and the gas suction nozzle is configured so that a speed of a gas flow produced by the at least one of the gas inlet and the gas suction nozzle is at a lowest speed of a speed distribution of the gas flow at a level-height defined by a surface of the working plane.

9. The method according to claim 1, wherein the gas suction nozzle comprises a ring nozzle.

10. The method according to claim 9, further comprising extracting from the center of the ring nozzle.

11. The method according to claim 1, wherein the apparatus for producing a three-dimensional object has a process chamber, the process chamber comprising a coupling-in window through which radiation for selectively solidifying the build-up material is coupled into the process chamber and wherein, after completion of a production process, the gas suction nozzle provides suction on the coupling-in window for cleaning contaminants from the coupling-in window.

12. The method according to claim 1, wherein the gas suction nozzle is moved together with the coating device.

13. The method according to claim 1, wherein the gas suction nozzle is attached to the coating device and moved together with the coating device.

14. The method according to claim 1, wherein the apparatus further comprises a second gas suction nozzle, and wherein at least the gas suction nozzle and the second gas suction nozzle are attached to the coating device and moved together with the coating device.

15. A method of moving and orienting a movable gas suction nozzle in an apparatus for producing a three-dimensional object through layer-wise solidifying of build-up material at positions corresponding to a cross-section of the object to be produced in a respective layer, wherein the method comprises:

providing a coating device that applies a layer of the build-up material on a working plane;

providing an energy or radiation source suitable for solidifying the build-up material that selectively solidifies the build-up material in the applied layer by impingement of a beam of the energy or radiation source on an applied layer;

providing a control unit that controls the energy or radiation source, the control unit further determining solidifying positions corresponding to cross-sections of the object, and the control unit selecting a plurality of reference positions on the working plane, to then control movement and orientation of the gas suction nozzle in relation to the impingement of the beam using the reference positions;

operating the gas suction nozzle to extract gas from a build chamber of the apparatus by suction, the gas suction nozzle being movably mounted above the working plane, wherein the reference positions comprise at least one nozzle orientation reference position selected from solidifying positions of a cross-section of the object being produced in the working plane;

operating the control unit to move and orient the nozzle using the at least one nozzle orientation reference position; and supplying a gas into the apparatus with a gas inlet, wherein the gas inlet and the gas suction nozzle are arranged in opposed fashion to each other and can be moved in tandem with each other with a substantially constant distance from one another; and wherein at least one of the gas inlet and the gas suction nozzle is configured so that a speed of a gas flow produced by the at least one of the gas inlet and the gas suction nozzle is at a lowest speed of a speed distribution of the gas flow at a level-height defined by a surface of the working plane.

16. A method of moving and orienting a movable gas suction nozzle in an apparatus for producing a three-dimensional object through layer-wise solidifying of build-up material at positions corresponding to a cross-section of the object to be produced in a respective layer, wherein the method comprises:

providing a coating device that applies a layer of the build-up material on a working plane;

providing an energy or radiation source suitable for solidifying the build-up material that selectively solidifies the build-up material in the applied layer by impingement of a beam of the energy or radiation source on an applied layer;

providing a control unit that controls the energy or radiation source, the control unit further determining solidifying positions corresponding to cross-sections of the object, and the control unit selecting a plurality of reference positions on the working plane, to then control movement and orientation of the gas suction nozzle in relation to the impingement of the beam using the reference positions;

operating the gas suction nozzle to extract gas from a build chamber of the apparatus by suction, the gas suction nozzle being movably mounted above the working plane, wherein the reference positions comprise at least one nozzle orientation reference position selected from solidifying positions of a cross-section of the object being produced in the working plane; and operating the control unit to move and orient the nozzle using the at least one nozzle orientation reference position, wherein the apparatus for producing a three-dimensional object has a process chamber, the process chamber comprising a coupling-in window through which radiation for selectively solidifying the build-up material is coupled into the process chamber and wherein, after completion of a production process, the gas suction nozzle provides suction on the coupling-in window for cleaning contaminants from the coupling-in window.

* * * * *